(12) United States Patent
Xu et al.

(10) Patent No.: US 11,015,005 B2
(45) Date of Patent: May 25, 2021

(54) FLUOROCOPOLYMERS FOR COATING APPLICATIONS

(71) Applicant: HONEYWELL INTERNATIONAL INC., Morris Plains, NJ (US)

(72) Inventors: Gang Xu, Shanghai (CN); Siyuan Zhang, Shanghai (CN); Wanchao Jiang, Shanghai (CN); Linlin Duan, Shanghai (CN); Zhe Ding, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 191 days.

(21) Appl. No.: 15/353,678

(22) Filed: Nov. 16, 2016

(65) Prior Publication Data

US 2017/0145132 A1 May 25, 2017

Related U.S. Application Data

(60) Provisional application No. 62/257,812, filed on Nov. 20, 2015.

(51) Int. Cl.
| | |
|---|---|
| C08F 214/26 | (2006.01) |
| C09D 127/18 | (2006.01) |
| C09D 127/12 | (2006.01) |
| C08F 214/18 | (2006.01) |
| C08F 214/24 | (2006.01) |

(52) U.S. Cl.
CPC ........ C08F 214/26 (2013.01); C08F 214/182 (2013.01); C08F 214/184 (2013.01); C08F 214/186 (2013.01); C08F 214/24 (2013.01); C08F 214/245 (2013.01); C08F 214/247 (2013.01); C09D 127/12 (2013.01); C09D 127/18 (2013.01); C08F 2800/10 (2013.01); C08F 2800/20 (2013.01)

(58) Field of Classification Search
CPC C08F 214/26; C08F 2800/10; C08F 2800/20; C08F 214/182; C08F 214/184; C08F 214/186; C08F 214/24; C08F 214/245; C08F 214/247; C09D 127/18; C09D 127/12
USPC ...................................................... 524/546
See application file for complete search history.

(56) References Cited

U.S. PATENT DOCUMENTS

| 5,082,911 A | 1/1992 | Kappler et al. |
| 5,098,972 A | 3/1992 | Kappler et al. |
| 5,258,447 A | 11/1993 | Koishi et al. |
| 7,144,948 B2 * | 12/2006 | Yamauchi ................ C08F 6/10 524/576 |
| 2008/0171844 A1 | 7/2008 | Samuels et al. |
| 2011/0184116 A1 | 7/2011 | Kimura et al. |
| 2012/0184697 A1 * | 7/2012 | Samuels ............... B60C 1/0008 526/249 |
| 2013/0023636 A1 | 1/2013 | Imahori et al. |
| 2013/0089671 A1 | 4/2013 | Nalewajek et al. |
| 2013/0345381 A1 | 12/2013 | Amin-Sanayei et al. |
| 2014/0087195 A1 | 3/2014 | Rainal et al. |
| 2014/0339167 A1 * | 11/2014 | Lu ......................... B01D 71/32 210/650 |
| 2015/0112015 A1 | 4/2015 | Jiang et al. |

FOREIGN PATENT DOCUMENTS

| CN | 1046911 | 11/1990 |
| CN | 104892811 | 9/2015 |
| CN | 104945549 | 9/2015 |
| JP | S61-275311 | 12/1986 |
| JP | H03-146177 | 6/1991 |
| JP | H04-18473 | 1/1992 |
| JP | 2015-502411 | 1/2015 |
| JP | 2015-530495 | 10/2015 |
| WO | 2008079879 | 7/2008 |
| WO | 2008079886 | 7/2008 |
| WO | 2008079986 | 7/2008 |
| WO | 2016040525 | 3/2016 |
| WO | 2016094121 | 6/2016 |

OTHER PUBLICATIONS

PCT/US2016/062704—International Search Report.
EP16867200—Supplemental European Search Report.

* cited by examiner

*Primary Examiner* — Josephine L Chang
(74) *Attorney, Agent, or Firm* — Roberts & Roberts, LLP; Richard S. Roberts, Jr.

(57) ABSTRACT

Disclosed are copolymers formed by copolymerization of: (1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene, with said 1,3,3,3-tetrafluoropropene preferably comprising, consisting essentially of or consisting of trans-1,3,3,3-tetrafluoropropene, and combinations of these, and (2) one or more chlorofluoroethylene monomers, preferably chlorotrifluoroethylene ("CTFE") monomers, wherein the mole ratio of monomer (1) to monomer (2) is preferably from about 30:1 to about 1:30.

24 Claims, No Drawings

FLUOROCOPOLYMERS FOR COATING APPLICATIONS

RELATED APPLICATIONS

This application claims the benefit of U.S. provisional application Ser. No. 62/257,812, filed Nov. 20, 2015, which is incorporated herein by reference in its entirety.

FIELD OF THE INVENTION

The present invention relates to novel fluorocopolymers having excellent adhesion to substrates and excellent resistance to weathering and corrosion, as well as other advantageous properties, and coating compositions formed from such polymers having high solids content, and to methods of reducing the exposure of earth's atmosphere to volatile organic compounds (VOCs) while forming protective coatings on substrates.

BACKGROUND OF THE INVENTION

Volatile organic compounds (VOCs) are volatile compounds of carbon that are subject to regulation by various government authorities, and for the purposes of the present invention the term is used consistent with proposed regulations established by the United States Environmental Protection Agency (EPA). More specifically, these proposed regulations establish that a compound of carbon is a VOC if it has a vapor pressure of less than about 0.1 millimeters of mercury at 20° C.

A variety of chemicals are within the definition of VOC, and some of these chemicals have short- and long-term adverse health effects when released into the atmosphere. Accordingly, many countries have regulations governing the release of such compounds into the earth's atmosphere. One relatively large source of release of such compounds into the environment has been from the solvents that are used in coating products such as, paints, varnishes, waxes, adhesives, inks and the like. Many cleaning, disinfecting, cosmetic, degreasing, and hobby products also contain VOCs as solvents or carriers. One method to reduce or eliminate the release of such compounds into the atmosphere is to capture and prevent release of the solvent as it evaporates from the coating composition. Such methods can involve, for example, the installation of a mechanism to capture the vapors and to process such vapors in an incinerator. However, as will be appreciated to those skilled in the art a substantial capital cost and/or processing cost is incurred as a result of such operations, and such operations can sometimes add detrimentally to the time required to complete such coating operations.

In order to reduce and control the VOC emission into the earth's atmosphere, more and more countries have started to regulate VOC emissions. Such regulations include in various countries charging a VOC tax upon release of such compounds. Accordingly, there are many incentives to reduce the release of VOCs into the atmosphere.

SUMMARY OF THE INVENTION

One aspect of the present invention provides fluorocopolymers formed by copolymerization of:
(1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene, with said 1,3,3,3-tetrafluoropropene preferably comprising, consisting essentially of or consisting of trans-1,3,3,3-tetrafluoropropene, and combinations of these, and
(2) one or more chlorofluoroethylene monomers, preferably chlorotrifluoroethylene ("CTFE") monomers, wherein the mole ratio of monomer (1) to monomer (2) is preferably from about 30:1 to about 1:30.

As used herein, the term "copolymer" means polymers having two or more different repeating units, and the term "fluorocopolymer" means copolymers in which at least one of the repeating units is based on a monomer that is a hydrofluoroolefin. The term "terpolymer" means polymers having three or more different repeating units, and the term "terfluorocopolymer" means terpolymers in which at least one of the repeating units is based on a monomer that is a hydrofluoroolefin. The term "tetrapolymer" is intended to include oligomers and copolymers having four or more different repeating units, and the term "tetrafluorocopolymer" means tetrapolymers in which at least one of the repeating units is based on a monomer that is a hydrofluoroolefin. Thus, a tetrapolymer derived from monomers A, B, C and D has repeating units (-A-), (—B—), (—C—) and (-D-), and a tetrafluorocopolymer derived from monomers A, B, C and D wherein at least one of these is a hydrofluoroolefin.

The repeating units according to the present invention can be arranged in any form, including as alternating copolymers, as periodic copolymers, statistical copolymers, block copolymers and graft copolymers.

According to certain preferred embodiments, the present invention provides terfluorocopolymers, and preferably tetrafluorcopolymers, formed by copolymerization of:
(1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene, with said 1,3,3,3-tetrafluoropropene preferably comprising, consisting essentially of or consisting of trans-1,3,3,3-tetrafluoropropene, and combinations of these;
(2) one or more chlorofluoroethylene monomers, preferably chlorotrifluoroethylene ("CTFE") monomers;
(3) optionally but preferably one or more vinyl ester monomer(s); and
(4) one or more vinyl ether monomer(s), wherein at least a portion of said vinyl ether monomer is a hydroxyl group-containing vinyl ether monomer.

According to preferred aspects, the present invention provides tetrafluorocopolymers as described in the previous paragraph wherein the polymer has a number average molecular weight of greater than about 10,000, preferably greater than about 12,000, and preferably in other embodiments greater than about 15,000.

One aspect of the present invention provides methods of reducing the release of volatile organic compounds (VOCs) into the earth's atmosphere during coating operations of the type that permit the escape of VOCs into the earth's atmosphere. In preferred embodiments the methods according to this aspect include the steps of:
(a) providing a substrate to be coated;
(b) providing a coating composition which is formed by steps comprising:
(i) providing one or more fluorocopolymers by copolymerization of (1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene, with said 1,3,3,3-tetrafluoropropene preferably comprising, consisting essentially of or consisting of trans-1,3,3,3-tetrafluoropropene, and combinations of these, (2) one or more chlorofluoroethylene monomers, preferably chlorotrifluoroethylene ("CTFE") monomers, (3) one or more vinyl ester monomer(s), and (4) one or more vinyl ether monomer(s), wherein at least a portion of said vinyl ether monomer is a hydroxyl group-containing vinyl ether monomer, wherein the copolymer preferably has a number average molecular weight of greater than about 10,000, preferably greater than about 12,000, and certain other embodiments greater than about 15,000, as measured according the procedure as described herein; and (ii) providing a carrier for said one or more fluorocopolymers, said carrier comprising one or more VOC compounds; and (iii) combining said one or more fluorocopolymers with said carrier to produce a polymeric composition comprising not greater than about 30% by weight of said carrier, preferably with a solids content of at least about 70% by weight;

(c) coating the substrate with said coating composition; and (d) forming a protective polymeric layer on said substrate by allowing at least a substantial portion of said VOCs in said carrier to evaporate into the earth's atmosphere, whereby said protective coating is formed.

Another aspect of the present invention provides methods for obtaining a VOC tax credit as a result of reducing the release of volatile organic compounds (VOCs) into the earth's atmosphere compared to a baseline coating operation of the type that permits the escape of VOCs into the earth's atmosphere. In preferred embodiments, methods according to this aspect include the steps of:

(a) establishing a baseline release of VOCs from an existing operation which involves coating of a substrate with an existing coating composition;

(b) providing a reduced VOC coating composition formed by steps comprising:

(i) providing one or more fluoropolymers by copolymerization of (1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene, with said 1,3,3,3-tetrafluoropropene preferably comprising, consisting essentially of or consisting of trans-1,3,3,3-tetrafluoropropene, and combinations of these, (2) one or more chlorofluoroethylene monomers, preferably chlorotrifluoroethylene ("CTFE") monomers, (3) one or more vinyl ester monomer(s), and (4) one or more vinyl ether monomer(s), wherein at least a portion of said vinyl ether monomer is a hydroxyl group-containing vinyl ether monomer, wherein the copolymer preferably has a number average molecular weight of greater than about 10,000, preferably greater than about 12,000 and certain other embodiments greater than about 15,000, as measured according the procedure as described herein; and (ii) providing a carrier for said one or more fluoropolymers, said carrier comprising one or more VOC compounds; and (iii) combining said one or more fluoropolymers with said carrier to produce a polymeric composition comprising not greater than about 30% by weight of said carrier, preferably with a solids content of at least about 70% by weight;

(c) coating the substrate with said reduced VOC coating composition; and (d) forming a protective polymeric layer on said substrate by allowing at least a substantial portion of said VOCs in said carrier to evaporate into the earth's atmosphere, whereby said protective coating is formed and whereby the VOCs released using said reduced VOC coating compositions is reduced compared to said baseline release of VOC; and (e) submitting to an appropriate governmental agency a claim for tax credit based at least in part on said reduction in VOCs released from said coating operation.

According to certain preferred embodiments, the fluorocopolymer coating composition formed by step (b) of this invention has a solid content of from about 70% to about 90% by weight, and even more preferably in certain embodiments from about 75% to about 85% by weight. In preferred embodiments the fluorocopolymer coating composition formed by step (b) of this invention has a solid content of greater than about 75%

According to preferred embodiments, the fluorocopolymer coating composition formed by step (b) of this invention has a VOC content of less than about 450 g/l, more preferably less than about 400 g/l, and even more preferably less than about 350 g/l.

According to preferred embodiments, the fluorocopolymer coating composition formed by step (b) of this invention has a VOC content of from about 450 g/l to about 100 g/l, more preferably from about 400 g/l to about 200 g/l, and even more preferably from about 350 g/l to about 250 g/l.

As used herein, the term hydrofluoroolefins means compounds consisting of carbon, hydrogen and fluorine and having at least one carbon-carbon double bond. Hydrofluoroolefins include, but are not necessarily limited to, hydrofluoroethylenes, hydrofluoropropenes, hydrofluorobutenes and hydrofluoropentenes, and the like. Preferred hydrofluoroolefins used to form the coating composition of step (b) comprise one or more tetrafluoropropenes. The tetrafluoropropene(s) used in step (b) preferably comprise 1,3,3,3-tetrafluoropropene (HFO-1234ze) and/or 2,3,3,3-tetrafluoropropene (HFO-1234yf), with said 1,3,3,3-tetrafluoropropene preferably comprising, consisting essentially of or consisting of trans-1,3,3,3-tetrafluoropropene.

As used herein, the term chlorofluoroethylene means compounds consisting of 2 carbon atoms having a carbon-carbon double bond, chlorine and fluorine, and includes but is not necessarily limited to chlorotrifluoroethylene.

In preferred embodiments, the fluoropolymer of step (b) is formed by solution copolymerization of the monomers represented by (1), (2), (3) and (4) of step (b) (i). In preferred embodiments, step (b)(i) comprises solution copolymerizing:

(1) from about 40 mol % to about 60 mol %, and even more preferably from about 45 mol % to about 55 mol %, and even more preferably about 50 mol % of hydrofluoroolefin monomer(s), preferably selected from the group consisting of hydrofluoroethylenes, hydrofluoropropenes, hydrofluorobutenes and hydrofluoropentenes, more preferably from the group consisting of HFO-1234ze, HFO-1234yf and combinations of these, and even more preferably HFO-1234ze, with said HFO-1234ze preferably comprising, consisting essentially of or consisting of trans-HFO-1234ze;

(2) from about 40 mol % to about 60 mol %, and even more preferably from about 45 mol % to about 55 mol %, and even more preferably about 50 mol % of chlorofluoroethylene monomer(s), preferably CTFE, wherein the mole ratio of monomer (1) to monomer (2) is preferably from about 30:1 to about 1:30;

(3) from about 5 mol % to 45 mol % of vinyl ester or vinyl either or both of them, more preferably from about 10 mol % to about 40 mol %, and even more preferably from about 20 mol % to about 40 mol %, represented by formula $CH_2=CR^1—O(C=O)_xR^2$ and $CH_2=CR^3—OR^4$ respectively, wherein x is 1 and wherein Wand $R^3$ are independently either hydrogen or a methyl group, preferably hydrogen, and wherein $R^2$ and $R^4$ are independently selected from the group consisting of an unsubstituted straight-chain, branched-chain or alicyclic alkyl group having 1 to 12 carbon atoms, preferably from 2 to 8 carbon atoms; and (4) from about 3 mol % to about 30 mol % of hydroxyalkyl vinyl ether, more preferably from about 3 mol % to about 20 mol %, and even more preferably from about 3 mol % to about 10 mol % represented by formula $CH_2=CR^3—O—R^5—OH$, where $R^3$ is as defined above, preferably hydrogen, and $R^5$ is selected from the group consisting of a C2 to C12 unsubstituted straight-chain, branched-chain or alicyclic alkyl group, more preferably an unsubstituted straight chain alkyl group having from 3 to 5 carbons, preferably 4 carbons, wherein the mol % are based on the total of the monomers in the copolymer formation step.

According to preferred embodiments, the fluorocopolymer coating composition formed by step (b) of this invention has a VOC content of from about 450 g/l to about 100 g/l, more preferably from about 400 g/l to about 200 g/l, and even more preferably from about 350 g/l to about 250 g/l.

As used herein, the term hydrofluoroolefins includes but is not necessarily limited to hydrofluoroethylene, hydrofluoropropene, hydrofluorobutene and hydrofluoropentene, and the like. According to certain preferred embodiments, the hydrofluoroolefin used to form the coating composition of step (b) comprises 1,3,3,3-tetrafluoropropene (HFO-1234ze) and/or 2,3,3,3-tetrafluoropropene (HFO-1234yf), with said HFO-1234ze preferably comprising, consisting essentially of or consisting of trans-HFO-1234ze.

In preferred embodiments, the fluorocopolymer of step (bi) is formed by copolymerization, and preferably solution copolymerization, of the monomers represented by (1), (2), (3) and (4) as follows:

(1) from about 40 mol % to about 60 mol %, and even more preferably from about 45 mol % to about 55 mol %, and even more preferably about 50 mol % of hydrofluoroolefin monomers, preferably selected from the group consisting of hydrofluoroethylenes, hydrofluoropropenes, hydrofluorobutenes and hydrofluoropentenes, preferably from the group consisting of HFO-1234ze, HFO-1234yf and combinations of these, and even more preferably HFO-1234ze with said HFO-1234ze preferably comprising, consisting essentially of or consisting of trans-HFO-1234ze;

(2) from about 40 mol % to about 60 mol %, and even more preferably from about 45 mol % to about 55 mol %, and even more preferably about 50 mol % of chlorofluoroethylene monomer(s), preferably CTFE, wherein the mole ratio of monomer (1) to monomer (2) is from about 30:1 to about 1:30, (3A) from about 10 mol % to about 40 mol % of vinyl ester, more preferably from about 10 mol % to about 30 mol %, and even more preferably from about 10 mol % to about 20 mol %, represented by formula $CH_2=CR^1—O(C=O)_xR^2$, wherein x is 1 and wherein $R^1$ is either hydrogen or a methyl group, and wherein $R^2$ is selected from the group consisting of an unsubstituted straight-chain, branched-chain or alicyclic alkyl group having 1 to 12 carbon atoms;

(3B) from about 10 mol % to about 40 mol % of vinyl ether, more preferably from about 10 mol % to about 30 mol %, and even more preferably from about 10 mol % to about 20 mol %, represented by formula $CH_2=CR^3—OR^4$ respectively, wherein $R^3$ is independently either hydrogen or a methyl group and wherein $R^4$ are independently selected from the group consisting of an unsubstituted straight-chain, branched-chain or alicyclic alkyl group having 1 to 12 carbon atoms; and (4) from about 3 mol % to about 30 mol % of hydroxyalkyl vinyl ether, more preferably from about 3 mol % to about 20 mol %, and even more preferably from about 3 mol % to about 10 mol % represented by formula $CH_2=CR^3—O—R^5—OH$, where $R^3$ is as defined above, preferably hydrogen, and $R^5$ is selected from the group consisting of a C2 to C12 unsubstituted straight-chain, branched-chain or alicyclic alkyl group, wherein the mol % are based on the total of the monomers in the copolymer formation step.

In preferred embodiments, the fluoropolymer coating composition formed by step (b) of the present invention has a solids content of from about 70% to about 90% by weight, more preferably in certain embodiments of from about 75% to about 85% by weight, and at the same time has a VOC content of from about 450 g/l to about 100 g/l, more preferably from about 400 g/l to about 200 g/l, and even more preferably from about 300 g/l to about 200 g/l.

According to a preferred embodiment of the present invention, the co-polymer formation step (b) (i) comprises providing one or more fluorocopolymers by copolymerization of:

(1) first monomer(s) consisting essentially of HFO-1234ze and/or HFO-1234yf, wherein the HFO-1234ze is preferably trans-HFO-1234ze, preferably in an amount of from about 5 mol % to about 60 mol %, and more preferably from about 10 mol % to about 55 mol %, (2) second monomer comprising CTFE, preferably in an amount of from about 5 mol % to about 60 mol %, and more preferably from about 10 mol % to about 55 mol %, wherein the mole ratio of monomer (1) to monomer (2) is from about 5:1 to about 1:5, more preferably from about 2:1 to about 1:2;

(3) third monomer(s) comprising:

A) vinyl ester monomer(s), preferably in an amount of from about 5 mol % to about 45 mol %, more preferably from about 10 mol % to about 30 mol %, and even more preferably from about 10 mol % to about 20 mol %, represented by formula $CH_2=CR^1—O(C=O)_xR^2$, wherein x is 1 and wherein $R^1$ is either hydrogen or a methyl group, and wherein $R^2$ is selected from the group consisting of a substituted or unsubstituted straight-chain or branched-chain alkyl group having 5 to 12 carbon atoms, wherein said alkyl group includes at least one tertiary or quaternary carbon atom, and B) vinyl ether monomer(s), preferably in amounts of from about 10 mol % to about 40 mol % of vinyl ether, more preferably from about 5 mol % to about 45 mol %, more preferably from about 10 mol % to about 30 mol %, and even more preferably from about 10 mol % to about 20 mol %, represented by formula $CH_2=CR^3-OR^4$ respectively, wherein $R^3$ is independently either hydrogen or a methyl group and wherein $R^4$ is independently selected from the group consisting of a substituted or unsubstituted straight-chain or branched-chain alkyl group having 1 to 5 carbon atoms; and (4) fourth monomer(s) selected from hydroxyl group-containing vinyl ether monomer(s), preferably in an amount of from about 3 mol % to about 60 mol % of hydroxy vinyl ether monomer, preferably in an amount of from about 3 mol % to about 30 mol %, more preferably from about 3 mol % to about 20 mol %, and even more preferably from about 3 mol % to about 10 mol %, represented by formula $CH_2=C-R^5-OH$, where $R^5$ is selected from the group consisting of a C2 to C6 substituted or unsubstituted straight-chain or branched-chain alkyl group, wherein the mol % are based on the total of the monomers in the copolymer formation step.

As used herein, unless otherwise specifically indicated, reference to mol % is to the mol % of monomers used in the formation of the fluorocopolymer of the present invention, based on the total of the monomers.

In certain embodiments of the process, the copolymer formed by step (b) of the present invention has a number average molecular weight as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference, of from about 5000 and 50,000, more preferably from about 12,000 to about 20,000 and in certain embodiments a weight average molecular weight preferably from about 5000 to about 30,000, and more preferably from about 20,000 to about 30,000. The values described herein for molecular weight are based on measurements that use an Agilent-PL gel chromatography column (5 um MIXED-C 300*7.5 mm). The mobile phase is tetrahydrofuran (THF) at a flow rate of 1 ml/minute and a temperature of 35° C. A refractive index detector is used. The unit is calibrated with polystyrene narrow standard available from Agilent.

In certain embodiments, the coating composition formed by step (b) has a VOC content of less than about 450 g/l, more preferably less than about 400 g/l, and even more preferably less than about 300 g/l. The values described herein for VOC are based on measurements made according to ASTM 22369.9963 which covers the standard test method for the determination of the weight percent volatile content of solvent-borne and water-borne coatings. The procedure for calculating the Volatile Organic Compound (VOC) content of a liquid coating is to obtain a sample of the liquid coating to be tested and then weighing the coating in an aluminum foil dish to obtain the weight to the nearest 0.1 mg, which is designated in the following calculations as (W1). Add to the aluminum foil dish 3±1 ml of toluene solvent to form the coating specimen. The specimen is then draw into the syringe and the filled syringe is placed on the scale and the scale is tarred. The cap is removed from the syringe and the specimen is dispensed from the syringe into the dish to the target specimen weight (0.3±0.1 g if the expected result is =<40% volatile and 0.5±0.1 g if the expected result is =>40% volatile. The specimen is spread out in the dish to cover the bottom of the dish completely with as uniform thickness as possible. Obtain and record the weight of the specimen to the nearest 0.1 mg, which is designated as the Specimen Weight (SA) in the following calculations. The foil dish containing the specimens is then heated in the forced draft oven for 60 min at 110° C. Each dish is removed from the oven, placed immediately in a desiccator, cooled to ambient temperature, weighed to the nearest 0.1 mg, and this weigh is record, and is indicated as W2 in the following calculations.

To calculate the VOC, V, in the liquid coating, the following equations are used:

$$VA=1000*DA*(W2-W1)/SA]$$

Where:
VA=% volatiles (first determination),
W1=weight of dish,
W2=weight of dish plus specimen
SA=specimen weight,
DA=specimen specific Gravity and
VB=% volatiles (duplicate determination; calculate in same manner as VA).

As used herein, the term "substrate" refers to any device or article, or part of a device or article, to be coated.

As used herein, the term "carrier" is intended to refer to a component of a composition that serves to solvate, disperse and/or emulsify a monomeric or polymeric component of a composition.

DETAILED DESCRIPTION OF THE INVENTION

As described above, preferred aspects of the present invention involve coating methods that provide reduced VOC emissions while at the same time providing effective and efficient protective coatings on substrates. As those skilled in the art will appreciate, the quality of a protective coating applied to a substrate can be measured by a variety of coating properties that, depending on the particular application, are important for achieving a commercially successful coating on a given substrate. These properties include but are not limited to: (1) viscosity, (2) color retention and (3) substrate adhesion.

Viscosity as used herein is measured according the ASTM Standard Test Method for Measuring Solution Viscosity of Polymers with Differential Viscometer, Designation D5225-14. According to this method as used herein, the viscometer used is a Brookfield viscometer (DV-II+Pro) using spindles S18/S31 using torque values from between 40% and 80% at room temperatures of about 23±2° C. If a solvent is used for the measurements, it is butyl acetate.

According to certain preferred embodiments, the coating compositions formed according to the present methods exhibit: (1) a solid concentration of at least about 70% by weight; (2) a viscosity, as measured by the ASTM Standard Test Method for Measuring Solution Viscosity of Polymers with Differential Viscometer, Designation D5225-14, of not greater than about 1700 mPa-s at about 23±2° C., and a color change after about 1000 hours, of not greater than 2.0, more preferably not greater than about 1.5, and even more preferably not greater than about 1.2, as measured in comparison to the initial color, each as measured by ASTM D 7251, QUV-A; and a VOC content of not greater than about 450 g/l, more preferably not greater than about 400 g/l, and even more preferably not greater than about 350 g/l.

The QUV-A is measured as indicated above according to ASTM D 7251, which is QUV Accelerated Weathering Tester Operating Procedure by which accelerated testing is performed in an accelerated testing cabinet sold under the trade mark QUV® manufactured by Q-Lab Corporation of Cleveland Ohio. Two lamps are used in this testing cabinet: "A" lamps (UVA-340) have a normal output of 0.69 W/m² @ 340 nm m and a maximum output of 1.38 W/m² @ 340 nm m; and "B" lamps (UVA-313) have a normal output of 0.67 W/m² @ 310 nm 0.67 and a maximum output of 1.23 W/m² @ 310 nm m. As used herein, the designation QUV-A refers to tests using the A lamps and QUA-B refers to tests using the B lamps. The procedure is accomplished using the following steps:
1. Measure the initial gloss of the coating film three times and obtain the average of the measurements, which is designated in the following calculations as "A."
2. Place the test plate containing the coating in the panel holder in the cabinet and power the cabinet on.
3. Set the PROGRAM button in the control panel and select the desired program operation.
4. Engage the RUN button to start test.
5. Record down the exposure time indicated on the led panel
6. Stop the machine after the indicated hours, remove the test plate, and measure the gloss three times to get an average result for the indicated exposure time, and record this value as "B" for use in the calculation below.
7. Determine Gloss retention using the formula Gloss Retention=B/A In preferred embodiments, the polymers of the present invention have a hydroxyl value of greater than about 70, and in other preferred embodiments have a hydroxyl value of greater than about 90. As mentioned above, the ability to achieve such a method resides, in part, on the judicious selection of the type and the amounts of the various components that are used to form the fluoropolymer and the coating compositions of the present invention.

In preferred embodiments, the polymers of the present invention have a fluorine content of from about 15% to about 20% by weight and a chlorine content of from about 12% to about 18% by weight. In other preferred embodiments, the polymers of the present invention have fluorine content of from about 16% to about 18% by weight and a chlorine content of from about 14% to about 16% by weight.

Monomers

Hydrofluoroolefins

The hydrofluoroolefin monomers according to the methods of the present invention can include in certain preferred embodiments hydrofluoroethylene monomer, that is, compounds having the formula $CX^1X^2=CX^3X^4$; wherein X', $X^2$, $X^3$, $X^4$ are each independently selected from H or F or Cl atom, but at least one of them is a hydrogen atom. Examples of hydrofluoroethylene monomers include, among others:
$CH_2=CHF$,
$CHF=CHF$,
$CH_2=CF_2$, and
$CHF=CF_2$.

The hydrofluoroolefin monomers according to certain preferred aspects of the methods of the present invention include, and preferably consists essentially of or consist of hydrofluoropropenes having the formula $CX^5X^6=CX^7CX^8X^9X^{19}$; wherein $X^5$, $X^6$, $X^7$, $X^8$, $X^9$ and $X^{10}$ are independently selected from H or F or Cl atom, but at least one of them is a hydrogen atom and another is a fluorine atom. Examples of hydrofluoro-propene monomers include, among others:
$CH_2=CFCF_3$ (HFO-1234yf),
trans-$CHF=CHCF_3$ (trans-HFO-1234ze),
$CHCl=CFCF_3$ and
$CH_2=CHCF_3$.

In preferred embodiments, the hydrofluoroolefin comprises, consists essentially of or consist of HFO-1234yf and/or HFO-1234ze. In preferred embodiments, the hydrofluoroolefin comprises, consists essentially of or consist of HFO-1234ze, with said HFO-1234ze preferably comprising, consisting essentially of or consisting of trans-HFO-1234ze.

The hydrofluoroolefin monomers according to certain preferred aspects of the methods of the present invention include, hydrofluorobutene according to the following formula: $CX^{11}X^{12}=CX^{13}CX^{14}X^{15}CX^{16}X^{17}X^{18}$; wherein $X^{11}$, $X^{12}$, $X^{13}$, $X^{14}$, $X^{15}$, $X^{16}$, $X^{17}$ and $X^{is}$ are independently selected from H or F or Cl atom, but at least one of them is a hydrogen atom and at least one is a fluorine atom. Examples of hydrofluorobutene include, among others, $CF_3CH=CHCF_3$.

Vinyl Esters

The copolymers in accordance with the present invention preferably are also formed from vinyl ester monomer units, preferably in amounts of from about 5 mol % to about 45 mol %, more preferably from about 10 mol % to about 30 mol %, and even more preferably from about 10 mol % to about 20 mol %. In preferred embodiments the vinyl ester monomer(s) are represented by the formula $CH_2=CR^1-O(C=O)_XR^2$, wherein x is 1 and wherein $R^1$ is either hydrogen or a methyl group, and wherein $R^2$ is selected from the group consisting of a substituted or unsubstituted, preferably unsubstituted, straight-chain or branched-chain, preferably branched chain, alkyl group having 5 to 12 carbon atoms, more preferably having from 5 to 10 carbon atoms, and even more preferably 8 to 10 carbon atoms. In preferred embodiments the alkyl group includes at least one tertiary or quaternary carbon atom. In highly preferred embodiments, the vinyl ester includes at least one quaternary carbon according to the following formula:

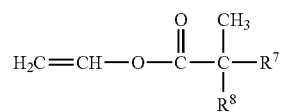

(Formula A)

where each of $R^7$ and $R^8$ are alkyl groups, preferably branched alkyl groups, that together contain from 5 to about 8, more preferably from 6 to 7, carbon atoms.

Examples of vinyl ester monomers that are preferred according to certain preferred embodiments include vinyl acetate, vinyl propionate, vinyl butyrate, vinyl pivalate, vinyl capronate, vinyl laurate, VEOVA-9 (vinyl versatate ester formed from a C9 carbocylic acid, produced by Momentive), VEOVA-10 (vinyl versatate ester formed from a C10 carbocyclic acid, produced by Momentive) and vinyl cyclohexanecarboxylate. Each of VEOVA-9 and VEOVA-10 contain at least one quaternary carbon according to Formula A above. According to preferred embodiments, the vinyl ester comprises vinyl versatate ester having from 11 to 12 carbon atoms in the molecule, preferably with at least one quaternary carbon according to Formula A above.

Vinyl Ethers

The copolymers in accordance with the present invention preferably are also formed from vinyl ether monomer units, preferably in amounts of from about 5 mol % to about 45 mol %, more preferably from about 10 mol % to about 30 mol %, and even more preferably from about 10 mol % to about 20 mol %. In preferred embodiments the vinyl ester monomer(s) are represented by the formula $CH_2=CR^3-OR^4$, wherein $R^3$ is independently either hydrogen or a methyl group and wherein $R^4$ is selected from the group consisting of a substituted or unsubstituted, preferably unsubstituted, straight-chain or branched-chain, preferably straight chain, alkyl group having 1 to 5 carbon atoms, more preferably 1 to 3 carbon atoms. Examples of vinyl ether monomers that are preferred according to certain preferred embodiments include alkyl vinyl ethers such as methyl vinyl ether, ethyl, propyl vinyl ether, n-butyl vinyl ether, isobutyl vinyl ether, hexyl vinyl ether, octyl vinyl ether, decyl vinyl ether and lauryl vinyl ether. Vinyl ethers including an alicyclic group can also be used, for example, cyclobutyl vinyl ether, cyclopentyl vinyl ether and cyclohexyl vinyl ether. According to preferred embodiments the vinyl ether comprises, consists essentially of, or consists of ethyl vinyl ether.

Preferably in those embodiments in which vinyl ether and vinyl ester monomers are both present, the amount of vinyl ether and vinyl ester monomers together comprise from about 25 mol % to about 45 mol % of the total monomers.

Hydroxy Vinyl Ethers

The copolymers in accordance with the present invention preferably are also formed from hydroxyl vinyl ether monomer units, preferably in amounts of from about 3 mol % to about 60 mol % of hydroxy vinyl ether monomer, preferably in an amount of from about 3 mol % to about 30 mol %, more preferably from about 3 mol % to about 20 mol %, and even more preferably from about 3 mol % to about 10 mol %. In preferred embodiments the hydroxyl vinyl ether monomer(s) are represented by the formula represented by formula $CH_2=CR^3-O-R^5-OH$, where $R^3$ is as defined above, preferably hydrogen, and where $R^5$ is selected from the group consisting of a C2 to C6 substituted or unsubstituted, preferably unsubstituted, straight-chain or branched-chain, prefeethrably straight chain, alkyl group. Examples of preferred hydroxyalkyl vinyl ether monomers include hydroxyl-ethyl vinyl ether, hydroxypropyl vinyl ether, hydroxybutyl vinyl ether, hydroxypentyl vinyl ether and hydroxyhexyl vinyl ether. In certain embodiments, the copolymer is formed from about 5 mol % to about 20 mol % of hydroxyalkyl vinyl ether monomers, based on the total weight of the monomer.

In preferred embodiments, the co-monomers according to the fluorocopolymer formation step (b)(i) comprise, and preferably consist essentially of:

(1) first monomer consisting essentially of HFO-1234ze, preferably in an amount of from about 20 mol % to about 30 mol %, and even more preferably from about 22 mol % to about 27 mol %, and even more preferably about 25 mol %, (1) second monomer consisting essentially of CTFE, preferably in an amount of from about 20 mol % to about 30 mol %, and even more preferably from about 22 mol % to about 27 mol %, and even more preferably about 25 mol %, (3) third monomer(s) comprising:

A) vinyl ester monomer represented by formula $CH_2=CR^1-O(C=O)_xR^2$ wherein x is 1 and wherein $R^1$ is either hydrogen or a methyl group, preferably hydrogen, and wherein $R^2$ is a substituted or unsubstituted branched or branched-chain alkyl group having 6 to 8 carbon atoms, preferably an unsubstituted branched-chain alkyl group having 6 to 8 carbon atoms, wherein said alkyl group preferably includes at least one tertiary or quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and B) vinyl ether monomer(s), represented by formula $CH_2=CR^3-OR^4$ respectively, wherein $R^3$ is independently either hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and (4) fourth monomer(s) consisting of hydroxyalkyl vinyl ether represented by formula $CH_2=CR^3-O-R^5-OH$, where $R^3$ is methyl or hydrogen, preferably hydrogen, and $R^5$ is selected from the group consisting a substituted or unsubstituted straight-chain or branched-chain C3 to C5 alkyl, preferably C4, unsubstituted straight-chain alkyl group, wherein the amount of said third monomer is preferably present in an amount of from about 3 mol % to about 30 mol %.

CoPolymer Formation Methods

It will be appreciated by those skilled in the art, based on the teachings contained herein, that copolymers of the present invention may be formed to achieve the preferred characteristics described herein using a variety of techniques, and all such techniques are within the scope of the present invention.

In preferred embodiments, the fluorocopolymer is preferably produced in a polymerization system that utilizes a carrier for the monomer/polymer during and/or after formation. According to one preferred embodiment the carrier acts as a solvent and/or dispersant for the monomer and/or polymer, and such operations include dispersion, emulsion and solution polymerization. Examples of carriers in such systems, including preferably solvents for solution polymerization, include: esters, such as methyl acetate, ethyl acetate, propyl acetate and butyl acetate; ketones, such as acetone, methyl ethyl acetone and cyclohexanone; aliphatic hydrocarbons, such as hexane, cyclohexane, octane, nonane, decane, undecane, dodecane and mineral spirits; aromatic hydrocarbons, such as benzene, toluene, xylene, naphthalene, and solvent napthta; alcohols, such as methanol, ethanol, tert-butanol, iso-propanol, ethylene glycol monoalkyl ethers; cyclic ethers, such as tetrahydrofuran, tetrahydropyran, and dioxane; fluorinated solvents, such as HCFC-225 and HCFC-141b; dimethyl sulfoxide; and the mixtures thereof.

It is contemplated that the temperature conditions used in the polymerization process of the present invention can be varied according to the particular equipment and applications involved and all such temperatures are within the scope of the present invention. Preferably, the polymerization is conducted at a temperature in a range of from about 30° C. to about 150° C., more preferably from about 40° C. to about 100° C., and even more preferably from about 50° C. to about 70° C., depending on factors such as the polymerization initiation source and type of the polymerization medium.

In certain preferred embodiments, it is preferred that the solution polymerization is conducted under conditions under which the total amount of the solvent used in the copolymerization process, based on the weight of the solvent and monomer in the solution, is from about 10 wt % to about 40 wt %, more preferably in amounts of from about 10 wt % to about 30 wt %, and more preferably in certain embodiments in an amount of from about 15% to about 25%. In certain of such embodiments, the solvent used in the solution copolymerization process comprises, preferably consists essentially of, and more preferably in certain embodiments consists of C2-C5 alkyl acetate, and even more preferably butyl acetate.

In preferred embodiments, the copolymer as formed in accordance with the preferred methods described herein is prepared by copolymerizing those monomers under conditions effective to achieve a copolymer having a number average molecular weight of 5000 to 50,000, or is some embodiments 5000 to 10,000 as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference. In certain embodiments, the copolymer has a number average molecular weight that is greater than about 10,000, and even more preferably from 10,000 to about 14,000. According to certain preferred embodiments, the copolymer has a molecular weight distribution of 2 to 10, more preferably 2.5 to 8, and most preferably 3 to 6. Applicants have found that in certain embodiments the use of copolymers having a molecular weight less than 5000 produces weatherability and chemical resistance of the protective coating that is less than is desired for some applications and that when the polymers have a molecular weight of more than 50,000, coating compositions having viscosities that may negatively impact the spreading or coating properties of the coating compositions and hence difficulties in the coating operations.

In preferred embodiments, the formation of fluorocopolymer coating compositions comprises, and preferably consists essentially of:
(i) providing one or more fluorocopolymers by copolymerization of
  (1) first monomer consisting essentially of HFO-1234ze, with said HFO-1234ze preferably comprising, consisting essentially of or consisting of trans-HFO-1234ze, preferably in an amount of from about 20 mol % to about 30 mol %, and even more preferably from about 22 mol % to about 27.5 mol %, and even more preferably about 25 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %, (3) third monomers comprising:
    A) vinyl ester monomer represented by formula $CH_2=CR^1-O(C=O)_xR^2$ wherein x is 1 and wherein $R^1$ is either hydrogen or a methyl group, preferably hydrogen, and wherein $R^2$ is an unsubstituted branched-chain alkyl group having 6 to 8 carbon atoms, wherein said alkyl group preferably includes at least one tertiary or quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is either hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is methyl or hydrogen, preferably hydrogen, and $R^5$ is selected from the group consisting of a C3 to C5, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds and preferably selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier to produce a polymeric composition comprising not greater than about 30% by weight of said carrier, preferably with a solids content of at least about 70% by weight. According to preferred embodiments, the fluorocopolymer composition of the present invention, and in particular the fluorocopolymer formed as described in the preceding sentence, has a polymer number average molecular weight as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference, of from about 5000 and 50,000, more preferably from about 7000 to about 15000 and has a solids content of from about 70% to about 90% by weight, and even more preferably from about 70% to about 85% by weight, and preferably a VOC content of less than about 400 g/l, more preferably from about 400 g/l to about 100 g/l, and even more preferably from about 350 g/l to about 200 g/l. It is also preferred in such embodiments as described in the present application in general, and in this paragraph as in particular, that the coating compositions of the present invention have a viscosity at 25° C. of less than about 1900 mPa-s, more preferably less than about 1800 mPa-s and even more preferably of less than about 1700 mPa-s as measured by Ford Cup at least at one of 12 revolutions per minutes (r/m), 30 r/m and 60 r/m, and preferably at all three speeds, preferably as measured according to ASTM D1200-10(2014) or ASTM D2196 as appropriate.

In preferred embodiments, the formation of fluorocopolymer coating compositions comprises, and preferably consists essentially of:
(i) providing one or more fluorocopolymers by copolymerization of
  (1) first monomer consisting essentially of HFO-1234ze, with said HFO-1234ze preferably comprising, consisting essentially of or consisting of trans-HFO-1234ze in an amount of from about 40 mol % to about 60 mol %, and even more preferably from about 45 mol % to about 55 mol %, and even more preferably about 50 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %,
  (3) third monomer(s) comprising:
    A) vinyl ester monomer represented by formula $CH_2=CR^1-O(C=O)_xR^2$ wherein x is 1 and wherein $R^1$ is either hydrogen or a methyl group, preferably hydrogen, and wherein $R^2$ is an unsubstituted branched-chain alkyl group having 6 to 8 carbon atoms including at least one tertiary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is either hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is either hydrogen or a methyl group and $R^5$ is selected from the group consisting of a substituted or unsubstituted straight-chain or branched-chain C3 to C5 alkyl, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
  (1) first monomer consisting essentially of HFO-1234ze, with said HFO-1234ze preferably comprising, consisting essentially of or consisting of trans-HFO-1234ze, preferably in an amount of from about 40 mol % to about 60 mol %, and even more preferably from about 45 mol % to about 55 mol %, and even more preferably about 50 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %,
  (3) third monomer(s) comprising:
    A) vinyl ester monomer represented by formula $CH_2=CR^1-O(C=O)_xR^2$ wherein x is 1 and wherein $R^1$ is a methyl group, preferably hydrogen, and wherein $R^2$ is an unsubstituted branched-chain alkyl group having 6 to 8 carbon atoms, wherein said alkyl group preferably includes at least one tertiary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is a is either hydrogen or a methyl group, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is methyl or hydrogen, preferably hydrogen, and $R^5$ is selected from the group consisting of an a substituted or unsubstituted straight-chain or branched-chain C3 to C5 alkyl, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds and preferably selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
  (1) first monomer consisting essentially of trans-HFO-1234ze in an amount of from about 40 mol % to about 60 mol %, and even more preferably from about 45 mol % to about 55 mol %, and even more preferably about 50 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %,
  (3) third monomer(s) comprising:
    A) vinyl ester monomer represented by formula $CH_2=CR^1-O(C=O)_XR^2$ wherein x is 1 and wherein $R^1$ is either hydrogen or a methyl group, preferably hydrogen, and wherein $R^2$ is an unsubstituted branched-chain alkyl group having 6 to 8 carbon atoms including at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is either hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is either hydrogen or a methyl group and $R^5$ is selected from the group consisting of a substituted or unsubstituted straight-chain or branched-chain C3 to C5 alkyl, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
  (1) first monomer consisting essentially of HFO-1234ze, with said HFO-1234ze preferably comprising, consisting essentially of or consisting of trans-HFO-1234ze, preferably in an amount of from about 40 mol % to about 60 mol %, and even more preferably from about 45 mol % to about 55 mol %, and even more preferably about 50 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %,
  (3) third monomer(s) comprising:
    A) vinyl ester monomer represented by formula $CH_2=CR^1-O(C=O)_XR^2$ wherein x is 1 and wherein $R^1$ is a methyl group, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is a methyl group, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is methyl or hydrogen, preferably hydrogen, and $R^5$ is selected from the group consisting of a substituted or unsubstituted straight-chain or branched-chain C3 to C5 alkyl, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds and preferably selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
  (1) first monomer consisting essentially of trans-HFO-1234ze in an amount of from about 40 mol % to about 60 mol %, and even more preferably from about 45 mol % to about 55 mol %, and even more preferably about 50 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %,
  (3) third monomer(s) comprising:
    A) vinyl ester monomer represented by formula $CH_2=CR^1-O(C=O)_xR^2$ wherein x is 1 and wherein $R^1$ is either hydrogen or a methyl group, preferably hydrogen, and wherein $R^2$ is an unsubstituted branched-chain alkyl group having 6 to 8 carbon atoms including at least one tertiary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is a methyl group and wherein $R^4$ is selected from consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is either hydrogen or a methyl group, preferably hydrogen, and $R^5$ is selected from the group consisting of a substituted or unsubstituted straight-chain or branched-chain C3 to C5 alkyl, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
  (1) first monomer consisting essentially of HFO-1234ze, with said HFO-1234ze preferably comprising, consisting essentially of or consisting of trans-HFO-1234ze, preferably in an amount of from about 40 mol % to about 60 mol %, and even more preferably from about 45 mol % to about 55 mol %, and even more preferably about 50 mol %,
  (2) second monomer(s) consisting essentially of CTFE, preferably in an amount of from about 20 mol % to about 30 mol %, and even more preferably from about 22 mol % to about 27.5 mol %, and even more preferably about 25 mol %,
  (3) third monomer(s) comprising:
    A) vinyl ester monomer represented by formula $CH_2=CR^1-O(C=O)_xR^2$ wherein x is 1 and wherein $R^1$ is a methyl group, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
    B) vinyl ether monomer(s), represented by formula $CH_2=CR^3-O-R^4$, wherein $R^3$ is a methyl group and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
  (4) fourth monomer(s) consisting of hydroxyalkyl vinyl ether represented by the formula $CH_2=CR^3-O-R^5-OH$, where $R^3$ is methyl or hydrogen, preferably hydrogen, and $R^5$ is selected from the group consisting of a substituted or unsubstituted straight-chain or branched-chain C3 to C5 alkyl, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds and preferably selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of (1) first monomer consisting essentially of trans-HFO-1234ze in an amount of from about 40 mol % to about 60 mol %, and even more preferably from about 45 mol % to about 55 mol %, and even more preferably about 50 mol %, (2) second monomer(s) consisting essentially of CTFE, preferably in an amount of from about 20 mol % to about 30 mol %, and even more preferably from about 22 mol % to about 27.5 mol %, and even more preferably about 25 mol %, (3) third monomer(s) comprising:

A) vinyl ester monomer represented by formula $CH_2=CR^1-O(C=O)_xR^2$ wherein x is 1 and wherein $R^1$ is hydrogen, and wherein $R^2$ is an unsubstituted branched-chain alkyl group having 6 to 8 carbon atoms including at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and B) vinyl ether monomer(s), represented by formula $CH_2=CR^3-O-R^4$, wherein $R^3$ is either hydrogen or a methyl group, preferably hydrogen, and wherein $R^4$ is selected from the group consisting of a substituted or unsubstituted branched-chain alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and (4) fourth monomer(s) consisting of hydroxyalkyl vinyl ether represented by the formula $CH_2=CR^3-O-R^5-OH$, where $R^3$ is either hydrogen or a methyl group and $R^5$ is selected from the group consisting of a C3 to C5, preferably C4, unsubstituted straight-chain alkyl group, wherein the amount of said third monomer is preferably from about 3 mol % to about 30 mol %; and (ii) providing a carrier for said one or more fluorocopolymers, said carrier comprising one or more VOC compounds selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and (iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:

(i) providing one or more fluorocopolymers by copolymerization of (1) first monomer consisting essentially of HFO-1234ze, with said HFO-1234ze preferably comprising, consisting essentially of or consisting of trans-HFO-1234ze, preferably in an amount of from about 40 mol % to about 60 mol %, and even more preferably from about 45 mol % to about 55 mol %, and even more preferably about 50 mol %, (2) second monomer(s) consisting essentially of CTFE, preferably in an amount of from about 20 mol % to about 30 mol %, and even more preferably from about 22 mol % to about 27.5 mol %, and even more preferably about 25 mol %, (3) third monomer(s) comprising:

A) vinyl ester monomer represented by formula $CH_2=CR^1-O(C=O)_xR^2$ wherein x is 1 and wherein $R^1$ is a methyl group, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and B) vinyl ether monomer(s), represented by formula $CH_2=CR^3-O-R^4$, wherein $R^3$ is a methyl group, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and (4) fourth monomer(s) consisting of hydroxyalkyl vinyl ether represented by the formula $CH_2=CR^3-O-R^5-OH$, where $R^3$ is methyl, and $R^5$ is selected from the group consisting of a C3 to C5, preferably C4, unsubstituted straight-chain alkyl group, wherein the amount of said third monomer is preferably from about 3 mol % to about 30 mol %;

(ii) providing a carrier for said one or more fluorocopolymers, said carrier comprising one or more VOC compounds and preferably selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and (iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:

(i) providing one or more fluorocopolymers by copolymerization of (1) first monomer consisting essentially of HFO-1234ze, with said HFO-1234ze preferably comprising, consisting essentially of or consisting of trans-HFO-1234ze, preferably in an amount of from about 40 mol % to about 60 mol %, and even more preferably from about 45 mol % to about 55 mol %, and even more preferably about 50 mol %, (2) second monomer(s) consisting essentially of CTFE, preferably in an amount of from about 20 mol % to about 30 mol %, and even more preferably from about 22 mol % to about 27.5 mol %, and even more preferably about 25 mol %,
(3) third monomer(s) comprising:
A) vinyl ester monomer represented by formula $CH_2\!=\!CR^1\!-\!O(C\!=\!O)_XR^2$ wherein x is 1 and wherein $R^1$ is hydrogen or a methyl group, preferably hydrogen, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
B) vinyl ether monomer(s), represented by formula $CH_2\!=\!CR^3\!-\!O\!-\!R^4$, wherein $R^3$ is hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
(4) fourth monomer(s) consisting of hydroxyalkyl vinyl ether represented by the formula $CH_2\!=\!CR^3\!-\!O\!-\!R^5\!-\!OH$, where $R^3$ is hydrogen or methyl, preferably hydrogen, and $R^5$ is selected from the group consisting of a C3 to C5, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising one or more VOC compounds selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and
(iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
(1) first monomer consisting essentially of trans-HFO-1234ze, preferably in an amount of from about 40 mol % to about 60 mol %, and even more preferably from about 45 mol % to about 55 mol %, and even more preferably about 50 mol %,
(2) second monomer(s) consisting essentially of CTFE, preferably in an amount of from about 20 mol % to about 30 mol %, and even more preferably from about 22 mol % to about 27.5 mol %, and even more preferably about 25 mol %,
(3) third monomer(s) comprising:
A) vinyl ester monomer represented by formula $CH_2\!=\!CR^1\!-\!O(C\!=\!O)_XR^2$ wherein x is 1 and wherein $R^1$ is hydrogen or methyl, preferably hydrogen, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and
B) vinyl ether monomer(s), represented by formula $CH_2\!=\!CR^3\!-\!O\!-\!R^4$, wherein $R^3$ is hydrogen or methyl, preferably hydrogen, and wherein $R^4$ is straight chain alkyl group having 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and
(4) fourth monomer(s) consisting of hydroxyalkyl vinyl ether represented by the formula $CH_2\!=\!CR^3\!-\!O\!-\!R^5\!-\!OH$, where $R^3$ is hydrogen or methyl, preferably hydrogen, and $R^5$ is selected from the group consisting of a C3 to C5, preferably C4, unsubstituted straight-chain alkyl group, wherein the amount of said third monomer is preferably from about 3 mol % to about 30 mol %; and
(ii) providing a carrier for said one or more fluorocopolymers, said carrier comprising at least about 50% by weight of C2-C5 alkyl acetate and even more preferably butyl acetate; and
(iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:
(i) providing one or more fluorocopolymers by copolymerization of
(1) first monomer consisting essentially of trans-HFO-1234ze, preferably in an amount of from about 40 mol % to about 60 mol %, and even more preferably from about 45 mol % to about 55 mol %, and even more preferably about 50 mol %,
(2) second monomer(s) consisting essentially of CTFE, preferably in an amount of from about 20 mol % to about 30 mol %, and even more preferably from about 22 mol % to about 27.5 mol %, and even more preferably about 25 mol %,
(3) third monomer(s) comprising:
A) vinyl ester monomer represented by formula $CH_2\!=\!CR^1\!-\!O(C\!=\!O)_XR^2$ wherein x is 1 and wherein $R^1$ is hydrogen or methyl, preferably hydrogen, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and

B) vinyl ether monomer(s), represented by formula $CH_2=CR^3—O—R^4$, wherein $R^3$ is hydrogen or methyl, preferably hydrogen, and wherein $R^4$ is straight chain alkyl group having 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and (4) fourth monomer(s) consisting of hydroxyalkyl vinyl ether represented by the formula $CH_2=CR^3—O—R^5—OH$, where $R^3$ is hydrogen or methyl, preferably hydrogen, and $R^5$ is selected from the group consisting of a C3 to C5, preferably C4, unsubstituted straight-chain alkyl group, wherein the amount of said third monomer is preferably from about 3 mol % to about 30 mol %;

(ii) providing a carrier for said one or more fluorocopolymers, said carrier comprising at least about 50% by weight of C2-C5 alkyl acetate and even more preferably butyl acetate; and (iii) combining said one or more fluorocopolymers with said carrier and said light stabilizer to produce a polymeric composition comprising not greater than about 30% by weight of said carrier, preferably with a solids content of at least about 70% by weight.

In preferred embodiments, the formation of fluorocopolymer coating compositions comprises, and preferably consists essentially of:

(i) providing one or more fluorocopolymers by copolymerization of (1) first monomer consisting essentially of trans-HFO-1234ze, preferably in an amount of from about 40 mol % to about 60 mol %, and even more preferably from about 45 mol % to about 55 mol %, and even more preferably about 50 mol %, (2) second monomer(s) consisting essentially of CTFE, preferably in an amount of from about 20 mol % to about 30 mol %, and even more preferably from about 22 mol % to about 27.5 mol %, and even more preferably about 25 mol %, (3) third monomer(s) comprising:

A) vinyl ester monomer represented by formula $CH_2=CR^1—O(C=O)_xR^2$ wherein x is 1 and wherein $R^1$ is hydrogen, and wherein $R^2$ is an unsubstituted branched-chain alkyl group having 6 to 8 carbon atoms, wherein said alkyl group preferably includes at least one quaternary carbon atom, wherein said vinyl ester monomer is present in an amount of from about 5 mol % to about 45 mol %, more preferably from about 10 mol % to about 30 mol %, and even more preferably from about 10 mol % to about 20 mol %; and B) vinyl ether monomer(s), represented by formula $CH_2=CR^3—O—R^4$, wherein $R^3$ is hydrogen and $R^4$ is selected from the group consisting of a substituted or unsubstituted branched-chain alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably from about 10 mol % to about 30 mol %, and even more preferably from about 10 mol % to about 20 mol %; and (4) fourth monomer(s) consisting of hydroxyalkyl vinyl ether represented by the formula $CH_2=CR^3—O—R^5—OH$, where $R^3$ is hydrogen, and $R^5$ is a C4 unsubstituted straight-chain alkyl group, wherein the amount of said third monomer is preferably from about 3 mol % to about 30 mol %;

(ii) providing a carrier for said one or more fluorocopolymers, said carrier comprising at least about 50% by weight of C2-C5 alkyl acetate and even more preferably butyl acetate; and (iii) combining said one or more fluorocopolymers with said carrier and said light stabilizer to produce a polymeric composition comprising not greater than about 30% by weight of said carrier, preferably with a solids content of at least about 70% by weight.

According to preferred embodiments, the fluorocopolymer composition of the present invention has a polymer number average molecular weight as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference, of from about 5000 and 50,000, more preferably from about 7000 to about 15,000 and has a solids content of from about 70% to about 90% by weight, and even more preferably from about 70% to about 85% by weight, and preferably a VOC content of less than about 400 g/l, more preferably from about 400 g/l to about 100 g/l, and even more preferably from about 350 g/l to about 200 g/l. It is also preferred in such embodiments as described in the present application in general, and in this paragraph in particular, that the coating compositions of the present invention have a viscosity at 25° C. of less than about 1900 mPa-s, more preferably less than about 1800 mPa-s and even more preferably of less than about 1700 mPa-s as measured by Ford Cup at least at one of 12 revolutions per minutes (r/m), 30 r/m and 60 r/m, and preferably at all three speeds, preferably as measured according to ASTM D1200-10 (2014) or ASTM D2196 as appropriate.

Coating Composition Formation Methods

The copolymers as formed in accordance with the procedures described herein may then be used to form various coating compositions that have the substantial advantages described above. For example, various solvents can be used for the preparation of solution-type paints or coatings by adding those solvents to the fluorocopolymer of the present invention formed as described herein. In certain embodiments, preferred solvents for formation of the coating composition include aromatic hydrocarbons such as xylene and toluene; alcohols such as n-butanol; esters such as butyl acetate; ketones such as methyl isobutyl ketone, and glycol ethers such as ethyl cellusolve and various commercial thinners.

In certain embodiments, the coating composition of the present invention has a solid content of from about 70% to about 90% by weight based on the total weight of the coating composition, and more preferably in certain embodiments from about 75% go about 85% by weight of solids. In certain preferred embodiments, the solids comprise and preferably consist essentially of the copolymers of the present invention and/or cross-linked copolymers formed using the copolymers of the present invention. Although it is contemplated that those skilled in the art will be able to form coatings using the present compositions according to anyone of known methods, in preferred embodiment the coating is formed by brushing, a rolling, air spraying, airless spraying, flow coating, roller coating, a spin coating, and the like and any combination of these may be used. Furthermore, the coating can be applied on various substrates. The coating film can be formed directly on a substrate or via a primer or if necessary, via an undercoating layer. Although all thicknesses are within the scope of the present invention, in preferred embodiments the outermost cured coating film layer has a layer thickness of from about 20 to about 30 m.

EXAMPLES

The present invention is further illustrated by the following non-limiting examples.

Example 1—Fluoropolymer Preparation

A solution polymerization operation is carried out by charging into a 300 ml stainless steel autoclave equipped with a stirrer the components as indicated in the following Table 1A:

TABLE 1A

| COMPONENT | | Weight, | | Monomer | Monomer, |
|---|---|---|---|---|---|
| TYPE | NAME | grams | Wt % | Moles | mol % |
| Solvent | toluene | 120 | 56.56 | | |
| First Monomer (fluoropolymer) | trans-1,3,3,3-tetrafluoropropene (trans-HFO-1234ze) | 9.24 | 27.2 | 0.17 | 25.32 |
| Second Monomer | CTFE | 9.38 | | 0.17 | 25.32 |
| Third Monomer (vinyl ester) | VEOVA-10 | 23.63 | 11.14 | 0.12 | 17.58 |
| Third Monomer (ethyl vinyl ether) | ethyl vinyl ether | 8.6 | 4.05 | 0.12 | 18.09 |
| Fourth Monomer (alkylhydroxy ether) | hydroxybutylvinyl ether | 10.83 | 5.1 | 0.19 | 13.75 |
| Initiator | tertbutylperoxypivalate | 0.2 | 0.16 | | |

The toluene, the ethyl vinyl ether monomer, the vinyl ester monomer (VEOVA-10), the hydroxybutyl vinyl ether, the initiator and 0.8 grams of zinc oxide were charged into the vessel. The mixture was solidified with liquid nitrogen, and deaerated to remove the dissolved air. Then the trans-1,3,3,3-tetrafluoropropene (trans-HFO-1234ze) and CTFE was added to the mixture in the autoclave, and the mixture was then gradually heated to about 75° C. The mixture was then stirred for about 4 hours to carry-out solution copolymerization of the monomers. After the autoclave was cooled to room temperature, any unreacted monomers were purged and then the autoclave was opened and a vacuum was applied to the autoclave for a sufficient period of time to remove sufficient excess solvent to achieve a solid content (copolymer content) in the autoclave of about 50-80% by weight. The final fluorocopolymer (without solvent) was tested and found to have: a number average molecular weight (Mn) of about 13,600 and a Mw/Mn of 2.3; a hydroxyl value of 96 mg KOH/g; a Fluorine content of 17.5% and a Chlorine content of 14.4%. The resulting copolymer plus solvent combination was in the form of a clear solution having a solid, that is, copolymer, content of about 70% and a VOC content of about 400 g/l.

The solvent/polymer resulting from the operation described about is then added to each of the materials identified in Table 1B below on a 1:1 weight basis and is found to form a clear solution at room temperature:

TABLE 1B

| Solubility Test (1:1 wt ratio) | |
|---|---|
| Solvent | Appearance |
| Methanol | Clear solution |
| Ethanol | Clear solution |
| Petroleum Ether | Clear solution |
| n-Hexane | Clear solution |
| Xylene | Clear solution |
| Toluene | Clear solution |
| Methyl Ethyl Ketone | Clear solution |
| Acetone | Clear solution |
| Propylene Glycol Monomethyl Ether Acetate (PMA) | Clear solution |
| Butyl Acetate | Clear solution |
| THF | Clear solution |

The result reported above indicates that the fluorocopolymer according to the present invention is capable of forming solutions with many materials that may be used in or form a substantial part of formulations for protective coatings, and accordingly the present fluorocopolymer has excellent usefulness in the formation of protective coatings in conjunction with a wide variety of materials that may be used, for example, as supplemental carriers in such coating compositions.

Example 2—Coating Composition and Coating Properties

A coating composition in the form of a white paste is formed by adding butyl acetate as thinner into copolymer solution formed in Example 1 to obtain a solution with a solid content of about 30-40 wt %. This solution is then charged into a glass flask and agitated at 250 rpm. A vacuum is then pulled on the flask until the vacuum reached about 100 Pa while maintaining the temperature of the copolymer solution at 18±1° C. The distilled solution is collected in a cold trap and monitored by GC-MS until no unreacted monomers, including HFO-1234ze and ethyl vinyl ether, or solvent were detected. The vacuum pump, agitation and temperature control is discontinued. Then ZnO was removed off by filtration. A transparent and colorless copolymer solution was obtained. After that, added $Al_2O_3$ molecular sieve A202-HF, a UOP product (8.0 wt % of the total polymer weight) or molecular sieve P188, a UOP product (2.0 wt % of the total polymer weight) or $Al_2O_3$ powder (7% wt) were added into the clear copolymer solution and the solution is heated to 87±2° C. for 14-18 hours with 250 rpm agitation. Agitation is then stopped, the glass flask is cooled to room temperature, the $Al_2O_3$ molecular sieve was removed off by filtration, a clear solution was obtained. The solution was then condensed to 50-80 wt % solid content.

Example 3—Fluoropolymer Preparation

A solution polymerization operation is carried out by charging into a 300 ml stainless steel autoclave equipped with a stirrer the components as indicated in the following Table 3A:

TABLE 3A

| COMPONENT | | Weight, | | Monomer | Monomer, |
|---|---|---|---|---|---|
| TYPE | NAME | grams | Wt % | Moles | mol % |
| Solvent | butyl acetate | 120 | 56.56 | | |
| First Monomer (fluoropolymer) | trans-1,3,3,3-tetrafluoropropene (trans-HFO-1234ze) | 19.6 | 27.2 | 0.17 | 25.32 |
| Second Monomer | CTFE | 19.9 | | 0.17 | 25.32 |
| Third Monomer (vinyl ester) | VEOVA-10 | 23.63 | 11.14 | 0.12 | 17.58 |
| Third Monomer (ethyl vinyl ether) | ethyl vinyl ether | 8.6 | 4.05 | 0.12 | 18.09 |
| Fourth Monomer (alkylhydroxy ether) | hydroxybutylvinyl ether | 10.83 | 5.1 | 0.19 | 13.75 |
| Initiator | tertbutylperoxypivalate | 0.2 | 0.16 | | |

The toluene, the ethyl vinyl ether monomer, the vinyl ester monomer (VEOVA-10), the hydroxybutyl vinyl ether, the initiator and 2 grams of zinc oxide were charged into the vessel. The mixture was solidified with liquid nitrogen, and deaerated to remove the dissolved air. Then the trans-1,3,3,3-tetrafluoropropene (trans-HFO-1234ze) and CTFE was added to the mixture in the autoclave, and the mixture was then gradually heated to about 75° C. The mixture was then stirred for about 4 hours to carry-out solution copolymerization of the monomers. After the autoclave was cooled to room temperature, any unreacted monomers were purged and then the autoclave was opened and a vacuum was applied to the autoclave for a sufficient period of time to remove sufficient excess solvent to achieve a solid content (copolymer content) in the autoclave of about 50-80% by weight. The final fluorocopolymer (without solvent) was tested and found to have: a number average molecular weight (Mn) of about 18000 and a Mw/Mn of 3.2; a hydroxyl value of 72 mg KOH/g; a Fluorine content of 16% and a Chlorine content of 15%. The resulting copolymer plus solvent combination was in the form of a clear solution having a solid, that is, copolymer, content of about 70% and a VOC content of about 400 g/l.

The solvent/polymer resulting from the operation described above is then added to each of the materials identified in Table 3B below on a 1:1 weight basis and is found to form a clear solution at room temperature:

TABLE 3B

| Solubility Test (1:1 wt ratio) | |
|---|---|
| Solvent | Appearance |
| Methanol | Clear solution |
| Ethanol | Clear solution |
| Petroleum Ether | Clear solution |
| n-Hexane | Clear solution |
| Xylene | Clear solution |
| Toluene | Clear solution |
| Methyl Ethyl Ketone | Clear solution |
| Acetone | Clear solution |
| Propylene Glycol Monomethyl Ether Acetate(PMA) | Clear solution |
| Butyl Acetate | Clear solution |
| THE | Clear solution |

The result reported above indicates that the fluorocopolymer according to the present invention is capable of forming solutions with many materials that may be used in or form a substantial part of formulations for protective coatings, and accordingly the present fluorocopolymer has excellent usefulness in the formation of protective coatings in conjunction with a wide variety of materials that may be used, for example, as supplemental carriers in such coating compositions.

Example 4—Coating Composition and Coating Properties

A coating composition in the form of a white paste is formed by adding butyl acetate as thinner into copolymer solution formed in Example 3 to obtain a solution with a solid content of about 30-40 wt %. This solution is then charged into a glass flask and agitated at 250 rpm. A vacuum is then pulled on the flask until the vacuum reached about 100 Pa while maintaining the temperature of the copolymer solution at 18±1° C. The distilled solution is collected in a cold trap and monitored by GC-MS until no unreacted monomers, including HFO-1234ze and ethyl vinyl ether, or solvent were detected. The vacuum pump, agitation and temperature control is discontinued. Then ZnO was removed off by filtration. A transparent and colorless copolymer solution was obtained. After that, added $Al_2O_3$ molecular sieve A202-HF, a UOP product (8.0 wt % of the total polymer weight) or molecular sieve P188, a UOP product (2.0 wt % of the total polymer weight) or $Al_2O_3$ powder (7 wt %) were added into the clear copolymer solution and the solution is heated to 87±2° C. for 14-18 hours with 250 rpm agitation. Agitation is then stopped, the glass flask is cooled to room temperature, the $Al_2O_3$ molecular sieve was removed off by filtration, a clear solution was obtained. The solution was then condensed to 50-80 wt % solid content.

What is claimed is:

1. A fluorocopolymer formed by copolymerization of monomers comprising:
   (1) one or more hydrofluoroolefin monomer(s) selected from the group consisting of hydrofluoroethylenes, hydrofluoropropenes, hydrofluorobutenes, hydrofluoropentenes and combinations thereof, said hydrofluoroolefin being present in the fluorocopolymer in an amount of from about 40 mol % to about 60 mol % based on the total moles of the monomers;
   (2) one or more chlorofluoroethylene monomers, said chlorofluoroethylene being present in the fluorocopolymer in and amount of from about 40 mol % to about 60 mol % based on the total moles of the monomers, whereby said molar ratio of said hydrofluoroolefin monomers to said chlorofluoroethylene monomers is from about 0.67 to about 1.5; and
   (3) one or more vinyl ether monomer(s), wherein at least a portion of said vinyl ether monomer is a hydroxyl group-containing vinyl ether monomer, and
   wherein said fluorocopolymer has a hydroxyl value of greater than about 70.

2. The fluorocopolymer of claim 1, wherein the one or more chlorofluoroethylene monomers comprises chlorotrifluoroethylene monomers.

3. The fluorocopolymer of claim 1, wherein the one or more hydrofluoroolefin monomer(s) is selected from hydrofluoropropenes.

4. The fluorocopolymer of claim 1, wherein the one or more hydrofluoroolefin monomer(s) is selected from 2,3,3,3-tetrafluoropropene, 1,3,3,3-tetrafluoropropene, and combinations thereof.

5. The fluorocopolymer of claim 1, wherein the one or more hydrofluoroolefin monomer(s) is selected from 1,3,3,3-tetrafluoropropene.

6. The fluorocopolymer of claim 5, wherein 1,3,3,3-tetrafluoropropene comprises trans-1,3,3,3-tetrafluoropropene.

7. A fluorocopolymer formed by copolymerization of monomers comprising:
(1) one or more hydrofluoroolefin monomer(s) selected from the group consisting of hydrofluoroethylenes, hydrofluoropropenes, hydrofluorobutenes, hydrofluoropentenes and combinations of these, said hydrofluoroolefin being present in the fluorocopolymer in an amount of from about 40 mol % to about 60 mol % based on the total moles of the monomers;
(2) one or more chlorofluoroethylene monomers, said chlorofluoroethylene being present in the fluorocopolymer in and amount of from about 40 mol % to about 60 mol % based on the total moles of the monomers, whereby said molar ratio of said hydrofluoropropene monomers to said chlorofluoroethylene monomers is from about 0.67 to about 1.5;
(3) one or more vinyl ester monomer(s); and
(4) one or more vinyl ether monomer(s), wherein at least a portion of said vinyl ether monomer is a hydroxyl group-containing vinyl ether monomer, and
wherein said fluorocopolymer has a hydroxyl value of greater than about 70.

8. The fluorocopolymer of claim 7, wherein the one or more chlorofluoroethylene monomers comprises chlorotrifluoroethylene monomers.

9. The fluorocopolymer of claim 7, wherein the one or more hydrofluoroolefin monomer(s) is selected from hydrofluoropropenes.

10. The fluorocopolymer of claim 9, wherein the one or more hydrofluoroolefin monomer(s) is selected from 2,3,3,3-tetrafluoropropene, 1,3,3,3-tetrafluoropropene, and combinations thereof.

11. The fluorocopolymer of claim 10, wherein the one or more hydrofluoroolefin monomer(s) is selected from 1,3,3,3-tetrafluoropropene.

12. The fluorocopolymer of claim 11, wherein 1,3,3,3-tetrafluoropropene comprises trans-1,3,3,3-tetrafluoropropene.

13. A fluorocopolymer formed by copolymerization of:
(1) from about 40 mol % to about 60 mol % hydrofluoropropene monomers;
(2) from about 40 mol % to about 60 mol % chlorofluoroethylene monomers, whereby said molar ratio of said hydrofluoropropene monomers to said chlorofluoroethylene monomers is from about 0.67 to about 1.5;
(3) from about 5 mol % to 45 mol % of vinyl ester, vinyl either ether or a mixture thereof, wherein the vinyl ester has the formula $CH_2=CR^1-O(C=O)_xR^2$ wherein x is 1, $R^1$ is a hydrogen or a methyl group, and $R^2$ is selected from the group consisting of an unsubstituted straight-chain, branched-chain or alicyclic alkyl group having 1 to 12 carbon atoms, and
wherein the vinyl ether has the formula $CH_2=CR^3-OR^4$, wherein $R^3$ is a hydrogen or a methyl group, and $R^4$ is selected from the group consisting of an unsubstituted straight-chain, branched-chain or alicyclic alkyl group having 1 to 12 carbon atoms; and (4) from about 3 mol % to about 30 mol % of hydroxyalkyl vinyl ether having the formula $CH_2=CR^3-O-R^5-OH$, where $R^3$ is a hydrogen or a methyl group, and $R^5$ is selected from the group consisting of a C2 to C12 unsubstituted straight-chain, branched-chain or alicyclic alkyl group having from 3 to 5 carbons,
wherein the mol % are based on the total of the monomers, and
wherein said fluorocopolymer has a hydroxyl value of greater than about 70.

14. The fluorocopolymer of claim 13, comprising from about 45 mol % to about 55 mol % of hydrofluoropropene monomers.

15. The fluorocopolymer of claim 13, comprising from about 50 mol % of hydrofluoropropene monomers.

16. The fluorocopolymer of claim 13, wherein the hydrofluoropropene monomers are selected from the group consisting of HFO-1234ze, HFO-1234yf and combinations of these.

17. The fluorocopolymer of claim 16, wherein the hydrofluoropropene monomers are trans-HFO-1234ze.

18. The fluorocopolymer of claim 13, comprising from about 45 mol % to about 55 mol % chlorofluoroethylene monomers.

19. The fluorocopolymer of claim 13, wherein the chlorofluoroethylene monomers are CTFE.

20. The fluorocopolymer of claim 13, comprising from about 10 mol % to about 40 mol % of vinyl ester, vinyl ether or a mixture thereof.

21. The fluorocopolymer of claim 13, comprising from about 20 mol % to about 40 mol % of vinyl ester, vinyl ether or a mixture thereof.

22. A fluorocopolymer composition comprising the fluorocopolymer of claim 13 and further comprising a carrier, wherein the fluorocopolymer comprises from about 3 mol % to about 20 mol % of the hydroxyalkyl vinyl ether, wherein said fluorocopolymer has a hydroxyl value of greater than about 70, wherein the fluorocopolymer composition has a solids content of from about 70% to about 90% by weight, and wherein the fluorocopolymer composition has a volatile organic compound content of from about 100 g/l to about 450 g/l.

23. A fluorocopolymer coating composition comprising:
(i) one or more fluorocopolymers formed by the copolymerization of:
(1) first monomer(s) consisting essentially of trans-HFO-1234ze in an amount of from about 40 mol % to about 60 mol %,
(2) second monomer(s) consisting essentially of CTFE in an amount of from about 20 mol % to about 30 mol %, whereby said molar ratio of said trans-HFO-1234ze to said CTFE is from about 1.33 to about 3,
(3) third monomer(s) comprising:
A) vinyl ester monomer represented by formula $CH_2=CR^1-O(C=O)_xR^2$ wherein x is 1 and wherein $R^1$ is either hydrogen or a methyl group and wherein $R^2$ is an unsubstituted branched-chain alkyl group having 6 to 8 carbon atoms including at least one tertiary or at least one quaternary carbon atom, wherein said vinyl ester monomer is present in an amount of from about 5 mol % to about 45 mol %; and
B) vinyl ether monomer(s), represented by formula $CH_2=CR^3-O-R^4$, wherein $R^3$ is either hydrogen or a methyl group and wherein $R^4$ is selected from the group consisting of a substituted or unsubstituted straight-chain or branched-chain alkyl group having 1 to 3 carbon atoms, said vinyl ether monomer(s) being present in amounts of from about 10 mol % to about 40 mol %; and (4) fourth monomer(s) consisting of hydroxyalkyl vinyl ether represented by the formula $CH_2=CR^3-O-R^5-OH$, where $R^3$ is either hydrogen or a methyl group and $R^5$ is selected from the group consisting of a substituted or unsubstituted straight-chain or branched-chain C3 to C5 alkyl, wherein the amount of said fourth monomer is from about 3 mol % to about 30 mol %, wherein the molar percentages of said first through fourth monomers are based on the total moles in the fluorocopolymer; and (ii) a carrier comprising one or more VOC compounds; wherein the fluorocopolymer coating composition has a solids content of from about 70% to about 90% by weight; and wherein the coating composition comprises not greater than about 30% by weight of said carrier.

24. The fluorocopolymer of claim 23, wherein said fluorocopolymer has a hydroxyl value of greater than about 70.

* * * * *